(12) United States Patent
Yoshimoto et al.

(10) Patent No.: US 7,589,871 B2
(45) Date of Patent: Sep. 15, 2009

(54) ORIGINAL TRANSPORT AND READING APPARATUS, READING POSITION ADJUSTMENT METHOD OF ORIGINAL TRANSPORT AND READING APPARATUS, AND IMAGE FORMING APPARATUS

(75) Inventors: Mitsuharu Yoshimoto, Nara (JP); Tomohiko Okada, Kyoto (JP); Yasuhiro Suto, Nara (JP); Kenji Nakanishi, Nara (JP); Hisashi Yamanaka, Nara (JP); Shohichi Fukutome, Kyoto (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 12/178,777

(22) Filed: Jul. 24, 2008

(65) Prior Publication Data

US 2009/0034027 A1 Feb. 5, 2009

(30) Foreign Application Priority Data

Jul. 30, 2007 (JP) ............................. 2007-197655

(51) Int. Cl.
*H04N 1/04* (2006.01)
(52) U.S. Cl. .................. 358/496; 358/498; 358/408; 358/486; 358/474; 358/463
(58) Field of Classification Search ................ 358/496, 358/498, 408, 486, 463–466, 461, 474; 399/364, 399/367, 374; 355/23; 382/274
See application file for complete search history.

(56) References Cited

U.S. PATENT DOCUMENTS 4,967,233 A * 10/1990 Buchar et al. ............... 358/496

| | | | |
|---|---|---|---|
| 6,563,938 B1 | 5/2003 | Harada | |
| 6,600,579 B1 * | 7/2003 | Kumagai et al. | 358/474 |
| 6,750,990 B1 | 6/2004 | Ohashi | |
| 7,110,148 B2 * | 9/2006 | Hasegawa et al. | 358/474 |
| 7,202,983 B2 * | 4/2007 | Yokota et al. | 358/496 |
| 7,391,540 B2 * | 6/2008 | Chen | 358/474 |
| 7,466,457 B2 * | 12/2008 | Chen | 358/461 |

FOREIGN PATENT DOCUMENTS

| | | |
|---|---|---|
| JP | 01-277054 | 11/1989 |
| JP | 2000-196814 | 7/2000 |
| JP | 2001-144901 | 5/2001 |
| JP | 2005-005752 | 1/2005 |

* cited by examiner

*Primary Examiner*—Cheukfan Lee
(74) *Attorney, Agent, or Firm*—Renner, Otto, Boisselle & Sklar, LLP

(57) ABSTRACT

An original transport and reading apparatus includes an original transport apparatus having a transport path, a first image reading unit that reads an image of an original facing the original transport apparatus, and a second image reading unit that is arranged inside the original transport apparatus and reads an image of the original. The second image reading unit includes a light source, a turning mirror, a lens, an image sensor, and a rotation support shaft, and is accommodated and held by a unit casing. The rotation support shaft performs support so as to allow rotation of the second image reading unit centered on a rotational fulcrum that is arranged along a reading light path for reading an image at a second reading position. Furthermore, a curved original guide having a guiding surface that is curved is arranged in a position corresponding to the light source.

11 Claims, 8 Drawing Sheets

ORIGINAL TRANSPORT AND READING APPARATUS, READING POSITION ADJUSTMENT METHOD OF ORIGINAL TRANSPORT AND READING APPARATUS, AND IMAGE FORMING APPARATUS

BACKGROUND OF THE INVENTION

This application claims priority under 35 U.S.C. § 119(a) on Patent Application No. 2007-197655 filed in Japan on Jul. 30, 2007, the entire contents of which are hereby incorporated by reference.

The present invention relates to original transport and reading apparatuses provided with an image reading unit in which the reading position for reading an image of an original is changed, reading position adjustment methods of original transport and reading apparatuses in which reading positions are adjusted, and image forming apparatuses provided with original transport and reading apparatuses that are provided with an image reading unit in which the reading position is changed.

Original transport and reading apparatuses have been proposed that are provided with an original transport apparatus having a transport path on which an original is transported, a first image reading unit that is arranged in opposition to the original transport apparatus and reads an image of a transported original at a first reading position that is demarcated along the transport path, and a second image reading unit that is arranged on an inner side of a casing of the original transport apparatus and reads an image of a transported original at a second reading position that is demarcated along the transport path.

This second image reading unit of the original transport and reading apparatus is arranged on an inner side of the casing of the original transport apparatus and reads an image of originals at a fixed second reading position, and therefore there is a problem in that maintenance of the reading light path cannot be executed easily.

That is, maintenance (cleaning) of the reading light path is executed by disassembling the inside of the original transport apparatus and withdrawing the second image reading unit.

Accordingly, an obstruction (for example, smearing or the like adhering to the reading glass) that occurs when reading an original with the reading light path of the second image reading unit cannot be removed easily, thereby causing a flaw (a white streak or a black streak or the like) in the image that is formed, which produces a problem in terms of image quality.

It should be noted as prior art that image reading apparatuses have been disclosed in which the reading position is changed by revolving a turning mirror (for example, see JP H01-277054A).

The present invention has been devised in consideration of these issues, and it is an object thereof to provide an original transport and reading apparatus provided with an original transport apparatus having a transport path on which an original is transported, in which by changing an arrangement of a reading light path formed by the image reading unit by changing a reading position that is demarcated along the transport path, an obstruction that has occurred on the reading light path is avoided to read an image of the original.

Furthermore, another object of the present invention is to provide a reading position adjustment method of an original transport and reading apparatus that adjusts a reading position of an original transport and reading apparatus provided with an original transport apparatus having a transport path on which an original is transported, wherein by comparing a pixel output value against a reference value for each pixel of an image sensor of the image reading unit to detect an abnormal state in advance and by changing the reading position until the abnormal state is eliminated, it is possible to obtain image data with high precision avoiding obstructions on the reading light path and to prevent in advance an occurrence of a problem in the image to be formed.

Furthermore, another object of the present invention is to achieve an image forming apparatus that is provided with an original transport and reading apparatus that transports an original and reads an image of the original, and an image forming unit that forms an image based on image data read by the original transport and reading apparatus, wherein by changing an arrangement of the reading light path formed by the image reading unit of the original transport and reading apparatus, an image of the original is read with high precision avoiding obstructions produced on the reading light path so that no flaws (white streaks, black streaks or the like) are produced in the image to be formed.

SUMMARY OF THE INVENTION

An original transport and reading apparatus according to the present invention is provided with an original transport apparatus having a transport path on which an original is transported, a first image reading unit that is arranged in opposition to the original transport apparatus and reads an image of a transported original at a first reading position that is demarcated along the transport path, a second image reading unit that is arranged on an inner side of a casing of the original transport apparatus and reads an image of a transported original at a second reading position that is demarcated along the transport path, a rotation support shaft that performs support so as to allow rotation of the second image reading unit centered on a rotational fulcrum that is arranged along a reading light path for reading an image at the second reading position, a rotational drive unit that drives so as to rotate the second image reading unit centered on the rotational fulcrum, and a curved original guide having a guiding surface that is curved in which the second reading position is set and that guides the original, wherein the guiding surface of the curved original guide is an arc whose constant radius is a distance between the second reading position and the rotational fulcrum.

With this configuration, the arrangement (position) of the reading light path is changed by changing the second reading position in a state in which the optical path length is fixed so that an obstruction present midway on the reading light path can be avoided, and therefore an influence on the image data of the original due to the obstruction on the reading light path can be eliminated. That is, when forming an image based on image data that has been read, an occurrence of defects (white streaks, black streaks) in the formed image originating in an obstruction such as smearing that is present on the reading light path are prevented.

Furthermore, in the original transport and reading apparatus according to the present invention, the second image reading unit may include a turning mirror on the reading light path that turns and reflects reflected light from the second reading position, and the rotational fulcrum may be caused to match a turning point of an optical axis of the reading light path.

With this configuration, even in a case where the second image reading unit is rotated and the reading position has changed, it is possible to maintain the optical axis of the reading light path.

Furthermore, the original transport and reading apparatus according to the present invention may include a deflecting original guide that deflects an original so that the original contacts the guiding surface of the curved original guide.

With this configuration it becomes possible to transport the original reliably corresponding to the second reading position, and the image can be read with high precision.

Furthermore, in the original transport and reading apparatus according to the present invention, the rotational drive unit may include an eccentric cam that is in contact with a unit casing that accommodates and holds the second image reading unit, and an eccentric cam drive unit that rotationally drives the eccentric cam.

With this configuration, even when the eccentric cam is revolved slightly, it is possible to cause large rotation of the second image reading unit, so that the second reading position can be changed easily and with high precision.

Furthermore, in the original transport and reading apparatus according to the present invention, a translucent protective plate may be arranged between the second reading position and the turning mirror.

With this configuration, it is possible to enable the reflected light of the original from the second reading position to be guided to the turning mirror and to prevent mechanical effects and ingression of dust from the transport path to the reading light path.

Furthermore, in the original transport and reading apparatus according to the present invention, the rotation support shaft may protrude from the unit casing and engage to a frame structure of the original transport apparatus.

With this configuration, the second image reading unit can be stably rotated.

Furthermore, in the original transport and reading apparatus according to the present invention, an image of a first side of an original may be read at the first reading position and an image of a second side of the original on an opposite side from the first side may be read at the second reading position.

With this configuration, it is possible to read images of both sides of the original easily and with high precision.

Furthermore, the original transport and reading apparatus according to the present invention may include a control unit that controls the rotational drive unit, wherein when a pixel output value of each pixel of an image sensor of the second image reading unit is compared against a reference value and an abnormal state has been detected, the control unit controls the rotational drive unit to rotate the second image reading unit.

With this configuration, it becomes possible to change the reading light path (second reading position) in response to a state of obstruction of the reading light path, and correct image data can be obtained by preventing the image data from being influenced by an obstruction (smearing or the like) that is present on the reading light path.

Furthermore, a reading position adjustment method of an original transport and reading apparatus according to the present invention is a method for adjusting a position of a second reading position of the original transport and reading apparatus including an original transport apparatus having a transport path on which an original is transported, a first image reading unit that is arranged in opposition to the original transport apparatus and reads an image of a transported original at a first reading position that is arranged along the transport path, and a second image reading unit that is arranged on an inner side of a casing of the original transport apparatus and reads an image of a transported original at a second reading position that is arranged along the transport path. The method includes a standby state detection step of detecting a standby state, a second reading position reflected light obtaining step of starting up the second image reading unit when a standby state has been detected, and obtaining reflected light from the second reading position by an image sensor of the second image reading unit, an abnormal state detection step of detecting a presence/absence of an abnormal state by comparing a pixel output value of reflected light obtained by each pixel against a reference value for each pixel of the image sensor, and a second reading position changing step of changing the second reading position by rotating the second image reading unit when an abnormal state has been detected in the abnormal state detection step, wherein the abnormal state detection step and the second reading position changing step are repeated until a determination is made that there is no abnormal state in any of the pixels of the image sensor.

With this configuration, the reading light path can be changed by changing the reading position when an obstruction has been detected in advance on the reading light path of the second image reading unit, and therefore it is possible to obtain image data with high precision by avoiding the obstruction on the reading light path of the second image reading unit, and occurrences of defects in the formed image can be prevented in advance.

Furthermore, an image forming apparatus according to the present invention includes an original transport and reading apparatus that transports an original and reads an image of the original, and an image forming unit that forms an image based on image data read by the original transport and reading apparatus, wherein the original transport and reading apparatus is an original transport and reading apparatus according to the present invention.

With this configuration, it is possible to change the arrangement of the reading light path formed by the second image reading unit of the original transport and reading apparatus to avoid an obstruction that has occurred on the reading light path so as to read an image of the original with high precision, and therefore an image forming apparatus can be achieved in which flaws (white streaks, black streaks or the like) are not produced in the image to be formed.

DESCRIPTION OF THE PREFERRED EMBODIMENTS

Hereinafter, embodiments of the present invention are described with reference to the accompanying drawings.

Embodiment 1

Description is given regarding an original transport and reading apparatus according to Embodiment 1 with reference to FIGS. 1 to 7.

Figure 1:
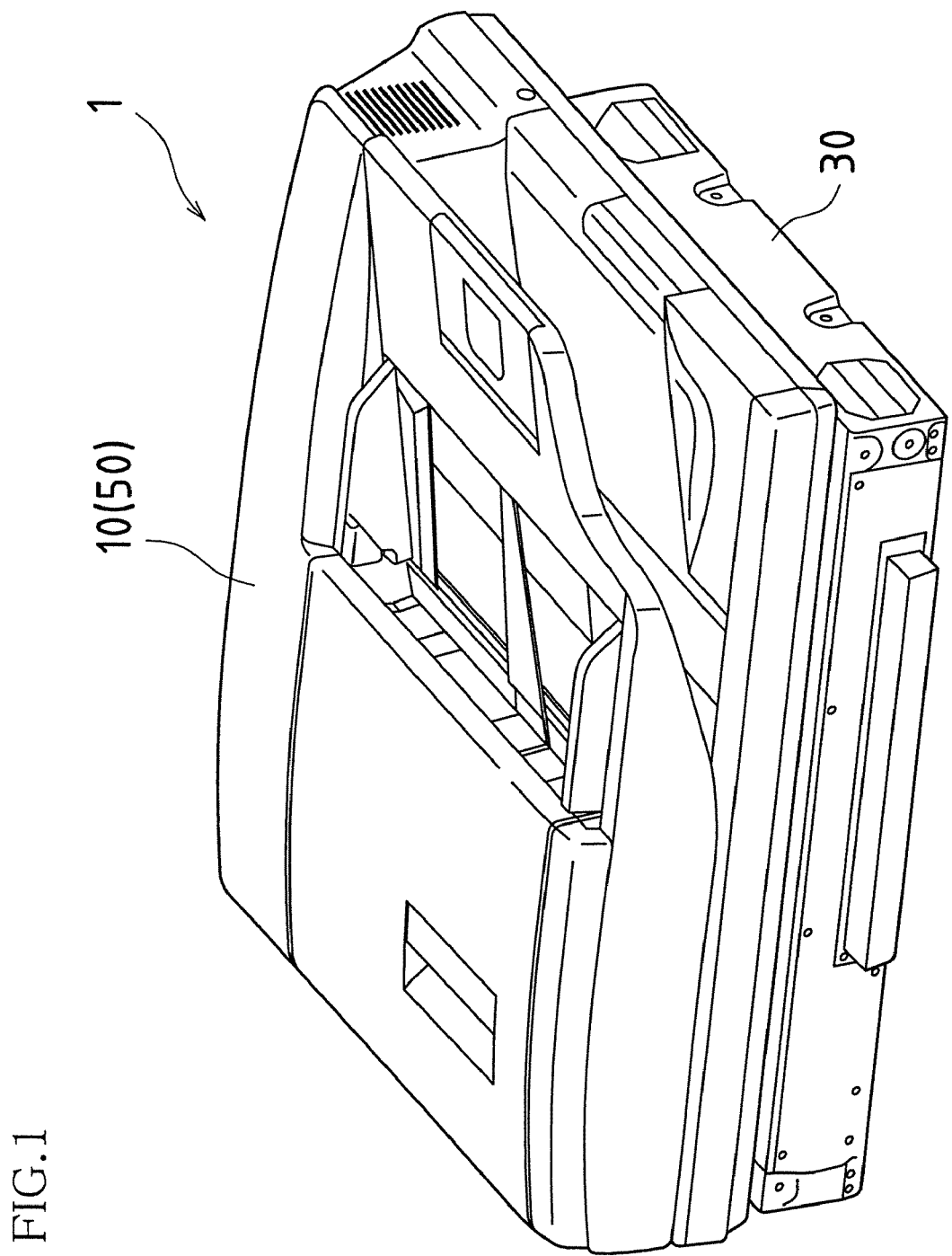
FIG. 1 is a perspective view showing an entire external view of an original transport and reading apparatus according to Embodiment 1 of the present invention.

FIG. 1 is a perspective view showing an entire external view of an original transport and reading apparatus according to Embodiment 1 of the present invention.

Figure 2:
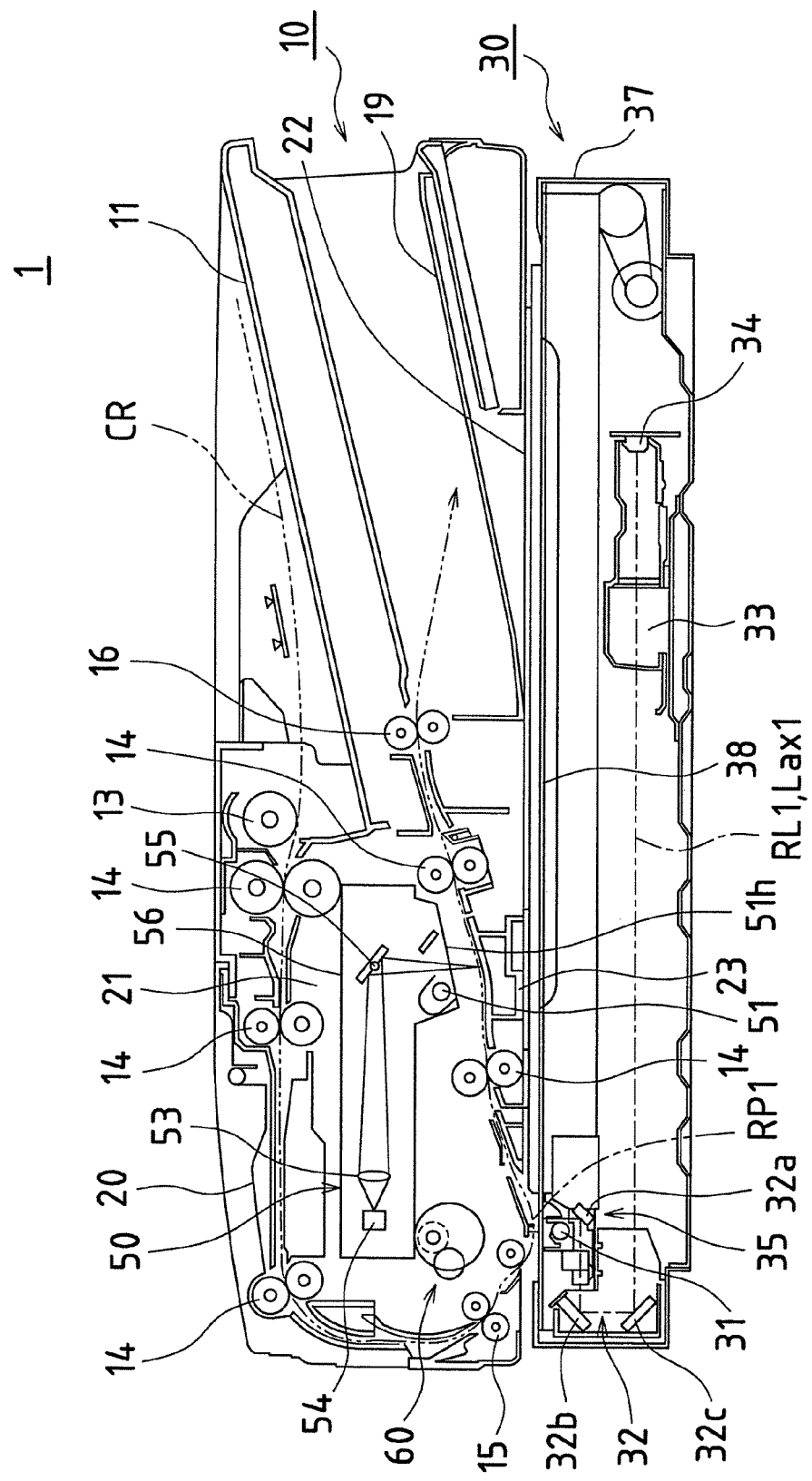
FIG. 2 is an opened-up lateral view showing an outline of an internal structure of the original transport and reading apparatus shown in FIG. 1 as seen through a lateral side.

FIG. 2 is an opened-up lateral view showing an outline of an internal structure of the original transport and reading apparatus shown in FIG. 1 as seen through a lateral side.

An original transport and reading apparatus 1 according to the present embodiment is provided with an original transport apparatus 10 having a transport path CR on which originals are transported, and a first image reading unit 30 that is arranged in opposition to the original transport apparatus 10 and reads images of the transported originals. Furthermore, a second image reading unit 50 that reads images of transported originals is arranged inside the original transport apparatus 10 (on an inner side of a casing 20 and an inner side of the transport path CR, which is substantially U-shaped in structure), thereby achieving a configuration capable of reading images of an original at two reading positions (a reading position of the first image reading unit 30 and a reading position of the second image reading unit 50).

The original transport apparatus 10 and the first image reading unit 30 are connected by a hinge (not shown) and the original transport apparatus 10 is openable and closable with respect to the first image reading unit 30 by way of rotation of the hinge.

The original transport apparatus 10 has a mechanism that automatically transports along the transport path CR originals that are loaded onto an original loading platform 11, and is structured as a so-called ADF (auto document feeder) for example.

The first image reading unit 30 is structured to read an image of a front side (first side) for example of an original that has been transported in, and the second image reading unit 50 is structured to read an image of a back side (second side, which is opposite from the first side) for example of an original that has been transported in.

The original transport apparatus 10 is provided with a draw-in roller 13 that draws in sheet by sheet originals that have been loaded on the original loading platform 11 into the original transport apparatus 10, a plurality of pairs of transport rollers 14 that transport drawn-in originals along the transport path CR, registration rollers 15 that regulate a paper-feed timing, and discharge rollers 16 that discharge originals for which image reading has been completed to a discharge tray 19.

The substantially U-shaped transport path CR is structured from the original loading platform 11 until the discharge tray 19 by the original loading platform 11, the draw-in roller 13, the transport rollers 14, the registration rollers 15, the discharge tray 19, and appropriately arranged original guides (guiding panels).

The original transport apparatus 10 has its external shape demarcated by a casing 20 and is provided with an appropriate frame structure 21 as a structural component.

A lower side of the original transport apparatus 10 (the side facing the first image reading unit 30) is structured having a pressing panel 22 that presses from above the original loaded onto a platen 38 of the first image reading unit 30. A portion of the pressing panel 22 that faces a light-source holder 51h of the second image reading unit 50 (which constitutes a part of a unit casing 56) acts as an openable lid portion 23.

The first image reading unit 30 is a reduction optical system image reading unit that is provided with a light source 31, a first mirror 32a, a second mirror 32b, a third mirror 32c, a lens 33, and an image sensor 34. The light source 31 is constituted by a lamp and irradiates light onto the originals that are transported in along the transport path CR. Light that has been irradiated onto an original at a first reading position RP1, which is set on the transport path CR, is reflected by the original and becomes incident on the first mirror 32a as reflected light.

The light reflected from the original has its optical path (reading light path RL1) altered as appropriate by the first mirror 32a, the second mirror 32b, and the third mirror 32c, and is optically guided to the lens 33 and the image sensor 34.

In other words, the reading light path RL1 (optical axis Lax1) is constituted by the first reading position RP1 (which can be understood as a light source of reflected light) and the first mirror 32a, the second mirror 32b, the third mirror 32c, and the lens 33.

Accordingly, the light irradiated from the light source 31 is reflected by the original, then becomes incident on the image sensor 34 via the reading light path RL1 and undergoes photoelectric conversion to be detected as image data.

The first image reading unit 30 is provided with a casing 37 and the platen 38, which is formed by a transparent glass plate, and the light source 31, the first mirror 32a, the second mirror 32b, the third mirror 32c, the lens 33, and the image sensor 34 are arranged inside the casing 37 and isolated from outside influence. Furthermore, a light source unit 35 is provided that mechanically stabilizes and holds the light source 31.

The first mirror 32a is arranged in the light source unit 35, and the second mirror 32b and the third mirror 32c constitute a mirror unit 32. By implementing units, a configuration is achieved that is mechanically stable and movable.

Generally, the first image reading unit 30 supports two methods of image reading, these being image reading based on a secured original method in which reading is carried out of an image of an original that has been loaded onto the platen 38 by a user, and image reading based on a moving original method in which an image of an original is read while the original is automatically transported by the original transport apparatus 10.

When reading an original image using the secured original method, the light source unit 35 and the mirror unit 32 move respectively to a home position corresponding to the secured original method (for example, a position corresponding to the first reading position RP1, which is demarcated to correspond to the transport path CR). After this, the light source unit 35 moves in a sub-scanning direction (a lateral direction in FIG. 2) at a constant velocity while irradiating light onto the original to scan the original (image), and along with the scanning by the light source unit 35, the mirror unit 32 moves similarly in the sub-scanning direction with a movement velocity that is half (½) the movement velocity of the light source unit 35.

After the reflected light, which involves light being irradiated onto the original from the light source unit 35 (light source 31) and reflected from the original, is reflected by the first mirror 32a arranged in the light source unit 35, it is converted 180° to an optical path (reading light path RL1) by the second mirror 32b and the third mirror 32c of the mirror unit 32, and the reflected light that is reflected from the third mirror 32c forms an image on the image sensor 34 via the lens 33, and this is converted to electrical image data.

On the other hand, when reading an original image using the moving original method, the light source unit 35 and the mirror unit 32 remain stationary at a home position (for example, the aforementioned first reading position RP1), and light is irradiated from the light source 31 onto the original, which is transported by the original transport apparatus 10 so as to pass over the first reading position RP1, thereby scanning an image, and after reflected light, which is reflected from the front side (first side) of the original for example, is reflected by the first mirror 32a in a same manner as in the secured original method, the reflected light is converted 180° to an optical path (reading light path RL1) by the mirror unit 32 (the second mirror 32b and the third mirror 32c ) and the reflected light that is reflected from the third mirror 32c forms an image on the image sensor 34 via the lens 33, and this is converted to electrical image data.

That is, as described above, the first image reading unit 30 is arranged in opposition to the original transport apparatus 10 and is structured to read an image of the original that is transported in at the first reading position RP1, which is demarcated along the transport path CR.

It should be noted that the second image reading unit 50 is provided with a light source 51, a lens 53, an image sensor 54, and the like. The second image reading unit 50 is implemented as a unit, is separated from the surroundings by the unit casing 56 that accommodates and holds the second image reading unit 50, and is arranged such that it is housed on the inner side of the transport path CR of the original transport apparatus 10. Furthermore, the second image reading unit 50 is provided with a rotational drive unit 60 that causes the unit casing 56 to rotate centered on a support shaft 55.

Figure 4:
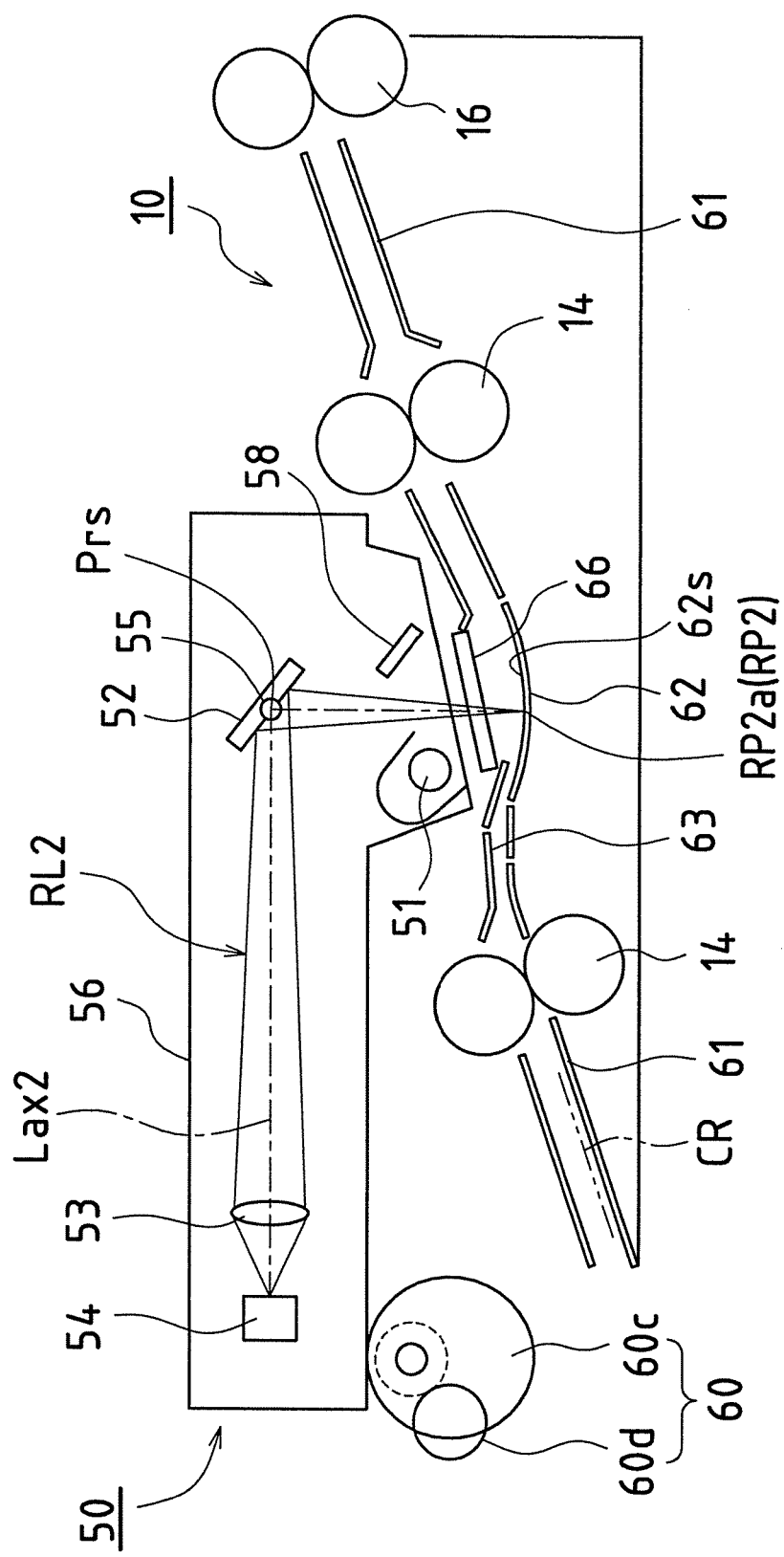
FIG. 4 is an opened-up lateral view showing an outline of an internal structure of the second image reading unit of the original transport and reading apparatus shown in FIG. 1 as seen through a lateral side in order to describe operation thereof in a state corresponding to the transport path.
Figure 5:
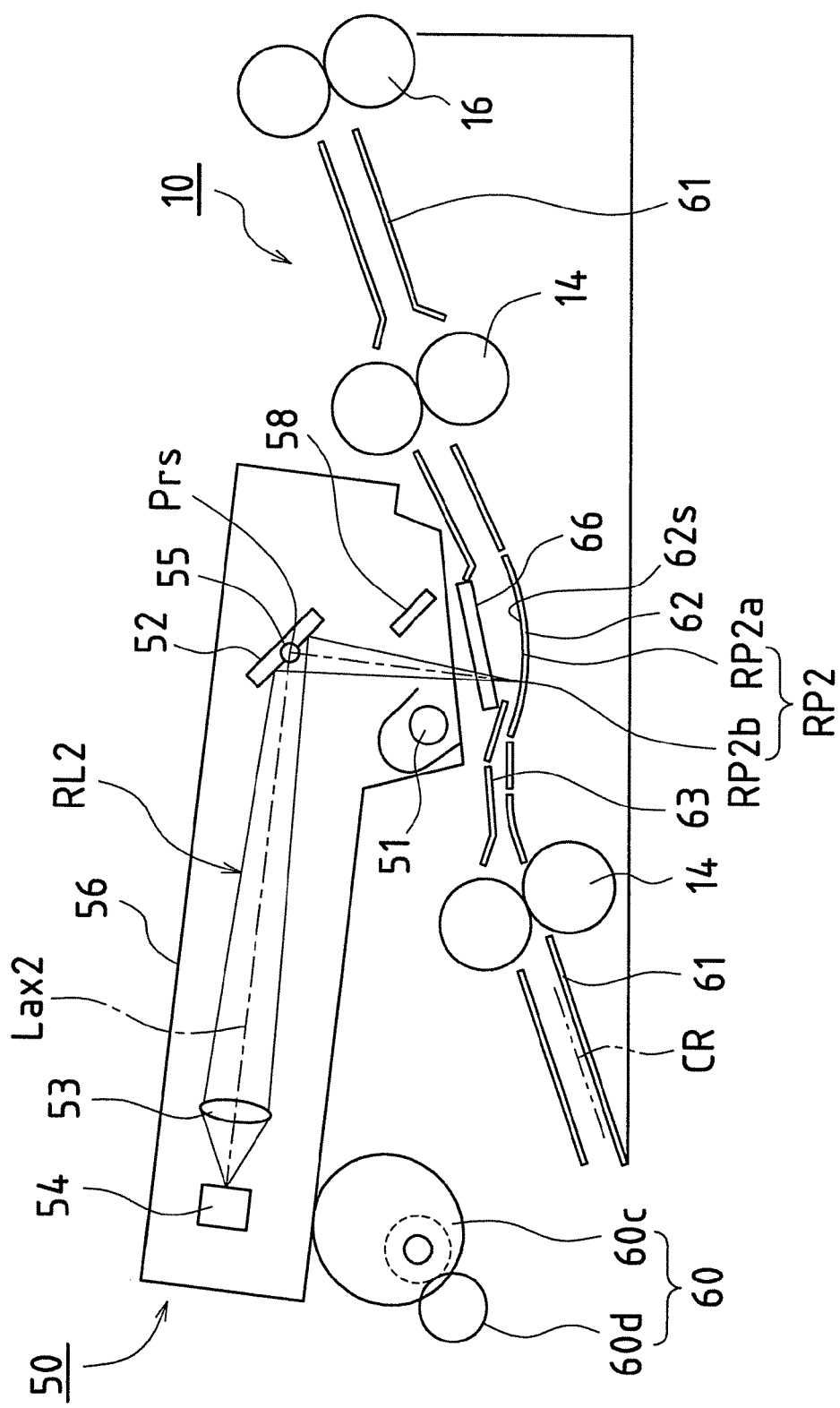
FIG. 5 is an opened-up lateral view showing a state of second image reading unit shown in FIG. 4 when rotated and tilted.

Details of the second image reading unit 50 are described using FIG. 4 and FIG. 5.

Figure 3:
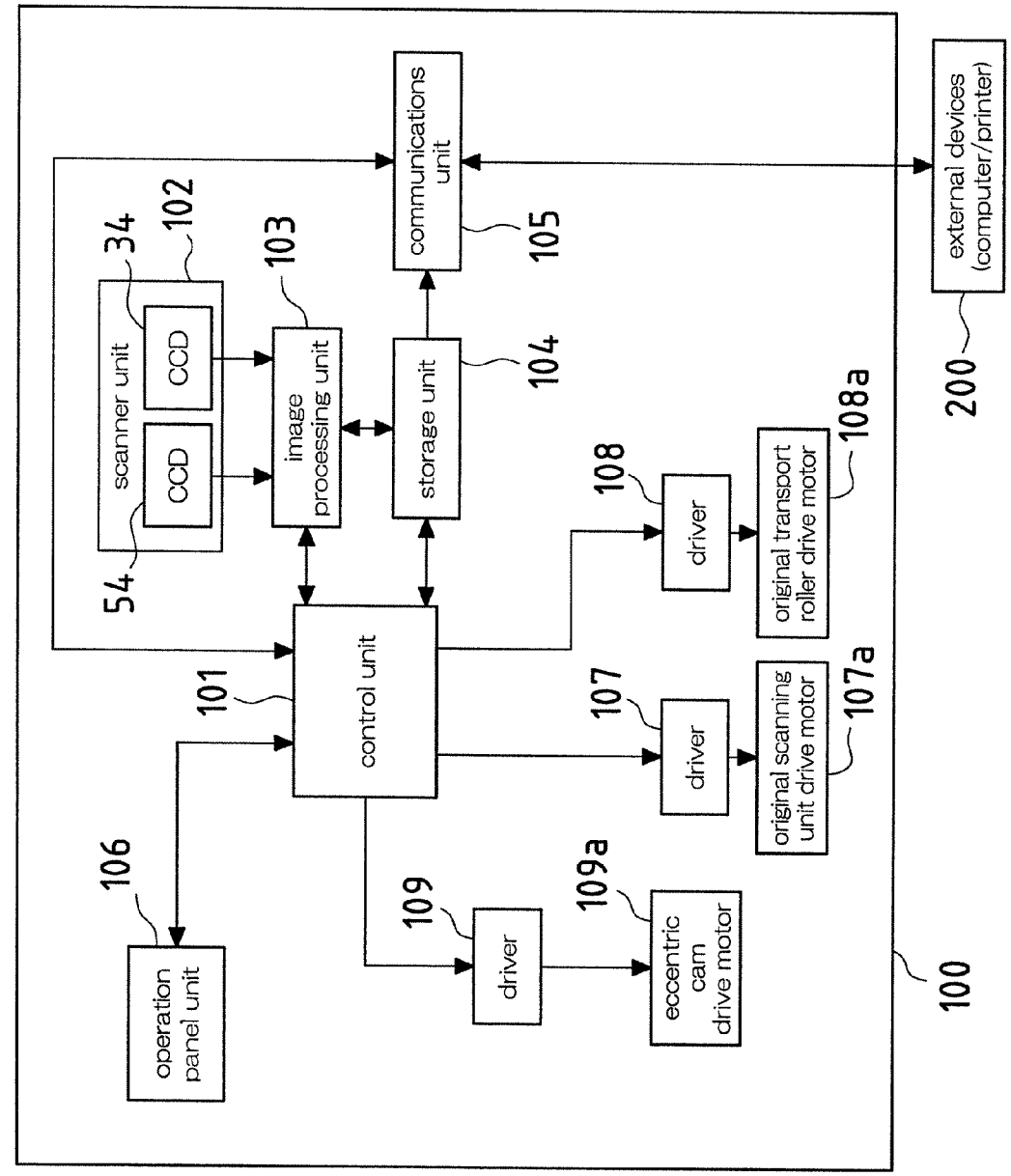
FIG. 3 is a block diagram that schematically shows main structural blocks of a control system unit of the original transport and reading apparatus shown in FIG. 1.

FIG. 3 is a block diagram that schematically shows main structural blocks of a control system unit of the original transport and reading apparatus shown in FIG. 1.

The original transport and reading apparatus 1 according to the present embodiment is provided with a control system unit 100 for operating internal mechanisms shown in FIG. 2. As main structural blocks, the control system unit 100 is provided with a control unit 101, a scanner unit 102, an image processing unit 103, a storage unit 104, a communications unit 105, an operation panel unit 106, a driver 107 that drives and controls an original scanning unit drive motor 107a, a driver 108 that drives and controls an original transport roller drive motor 108a, and a driver 109 that drives and controls an eccentric cam drive motor 109a to operate the rotational drive unit 60.

The control unit 101 is a block that manages operational control of the apparatus overall and is constituted for example by a CPU (central processing unit), a ROM that storages static programs, a RAM that stores data temporarily, and the like. Appropriate programs for operating the original transport and reading apparatus 1 are incorporated into the ROM in advance.

As is described later, a program that executes processing steps by which is executed a reading position adjustment method of the original transport and reading apparatus 1, in which a position of a second reading position RP2 of the original transport and reading apparatus 1 (original transport apparatus 10) is adjusted, is incorporated in advance in the control unit 101.

The scanner unit 102 is constituted by the optical scanning systems of the first image reading unit 30 and the second image reading unit 50. The image sensor 34 of the first image reading unit 30 and the image sensor 54 of the second image reading unit 50 can be constituted for example by optical reducing method CCDs (charge coupled devices). Instead of an optical reducing method CCD, it is possible to use an same magnification optical method CIS (contact image sensor).

The image processing unit 103 converts the image data that has been read by the first image reading unit 30 or the second image reading unit 50 into electrical image data page by page.

The storage unit 104 is constituted for example by a RAM, an EEPROM, a hard disk, an MO, or the like, and stores data such as data under the control and being controlled by the control unit 101, and various types of command information that has been inputted. Furthermore, the storage unit 104 is provided with regions that function as an image data storage unit that stores image data of originals read by the scanner unit 102 and a text storage unit that stores text constituted by codes of converted character strings.

The communications unit 105 is a communications unit that carries out bidirectional communications between the original transport and reading apparatus 1 and external devices 200 such as a computer and a printer connected to the original transport and reading apparatus 1, and sends data that has undergone image processing by the image processing unit 103 to the external devices 200. Furthermore, it is provided with a memory for developing data that has been sent from the external devices 200 into data that can be handled by the original transport and reading apparatus 1.

The operation panel unit 106 for example is arranged on a front side of the original transport and reading apparatus 1 shown in FIG. 1. Specifically, it is possible to extend the first image reading unit 30 further frontward than the original transport apparatus 10 and to arrange the operation panel unit on an upper surface portion thereof. The operation panel unit 106 is used in such cases as when operational modes during original reading are to be inputted (for instructions such as single side reading or double side reading).

The original scanning unit drive motor 107a is a motor for moving the light source unit 35 and the mirror unit 32 in the sub-scanning direction at an appropriate velocity when reading an original image using the secured original method, and is driven and controlled by the driver 107 in accordance with control from the control unit 101.

The original transport roller drive motor 108a is a motor that drives rollers such as the draw-in roller 13, the transport rollers 14, the registration rollers 15, and the discharge rollers 16 arranged on the transport path CR, and is driven and controlled as appropriate by the driver 108 in accordance with control from the control unit 101.

The eccentric cam drive motor 109a is a motor that causes operation of the rotational drive unit 60 and is driven and controlled as appropriate by the driver 109 in accordance with control from the control unit 101. That is, the control unit 101 controls the rotational drive unit 60.

FIG. 4 is an opened-up lateral view showing an outline of an internal structure of the second image reading unit of the original transport and reading apparatus shown in FIG. 1 as seen through a lateral side in order to describe operation thereof in a state corresponding to the transport path.

The original transport apparatus 10 constitutes the transport path CR by way of original guides 61, which are arranged in association with the transport rollers 14 and the discharge rollers 16, and which guide the originals. Accordingly, the originals are transported along a surface (guiding surface) of the original guides 61. That is, the surface of the transport path CR.

A curved original guide 62 having a curved guiding surface 62s (guiding surface 62s) that guides originals is arranged in a position corresponding to the light source 51. A second reading position RP2a (RP2) is demarcated (set) on the surface of the curved original guide 62 (the guiding surface 62s and the transport path CR). That is, the second reading position RP2a (RP2) is demarcated (set) to correspond to the light source 51 on the guiding surface 62s of the curved original guide 62, and originals are transported toward the second reading position RP2a (RP2).

Accordingly, the light irradiated from the light source 51 is reflected by the transported original at the second reading position RP2a and becomes incident on the second image reading unit 50 as reflected light.

Furthermore, an original guide 61 (a deflecting original guide 63) is arranged at an upstream side of the curved original guide 62. The deflecting original guide 63 is shaped to compel and deflect the original so as to guide the original and cause it to contact the transport path CR (curved original guide 62) corresponding to the second reading position RP2a.

That is, by way of the deflecting original guide 63, it becomes possible to transport the original reliably corresponding to the second reading position RP2a (RP2), and the image can be read with high precision.

As described above, the second image reading unit 50 is provided with the light source 51, the lens 53, the image sensor 54, the light-source holder 51h, and the rotation support shaft 55, and is accommodated and held by the unit casing 56. The second image reading unit 50 is further provided with a turning mirror 52 that turns and reflects the reflected light from the second reading position RP2, and a reflector 58 that reflects some of the light irradiated from the light source 51 toward the original to improve the irradiation efficiency.

Accordingly, the reflected light reflected by the original at the second reading position RP2 is incident on the second image reading unit 50, and is then incident on the image sensor 54 via a reading light path RL2 (optical axis Lax2), which is constituted by the turning mirror 52, a lens 53, and the image sensor 54 to be detected as image data.

In other words, the turning mirror 52 reflects the reflected light from the original toward the image sensor 54, and the lens 53 focuses the reflected light from the turning mirror 52 onto the image sensor 54. Furthermore, the image sensor 54 detects the irradiated reflected light as image data by performing photoelectric conversion.

As described above, the reflected light from the original at the second reading position RP2a (RP2) is incident on the turning mirror 52, then is turned and becomes incident on the image sensor 54 via the lens 53. That is, the reading light path RL2 is constituted by the second reading position RP2a (RP2) and the turning mirror 52.

The light source 51, the turning mirror 52, the lens 53, the image sensor 54, the rotation support shaft 55, and the reflector 58 are implemented as a unit so as to constitute a single integrated structure that is housed in the unit casing 56. The unit casing 56 is arranged on an inner side of a U-shaped region constituted by the transport path CR.

That is, the second image reading unit 50 is arranged in on an inner side of the casing 20 of the original transport apparatus 10 and is structured to read an image of the original that is transported in at the second reading position RP2, which is demarcated along the transport path CR.

The rotation support shaft 55 is arranged so as to match any position on the reading light path RL2 from the reading position of the original (second reading position RP2) to the image sensor 54. Furthermore, a center of the rotation support shaft 55 constitutes a rotational fulcrum Prs, which is a center of rotation of the rotation support shaft 55.

In the present embodiment, the rotational fulcrum Prs is arranged so as to match a turning point of the optical axis Lax2, which is a center of the reading light path RL2. That is, the rotational fulcrum Prs is arranged in a position where the surface of the turning mirror 52, which constitutes the turning point of the reading light path RL2, and the optical axis Lax2 are matched.

Accordingly, even in a case where the second image reading unit 50 is rotated and the position of the reading position RP2 has changed, it is possible to maintain the optical axis Lax2 of the reading light path RL2.

Figure 6:
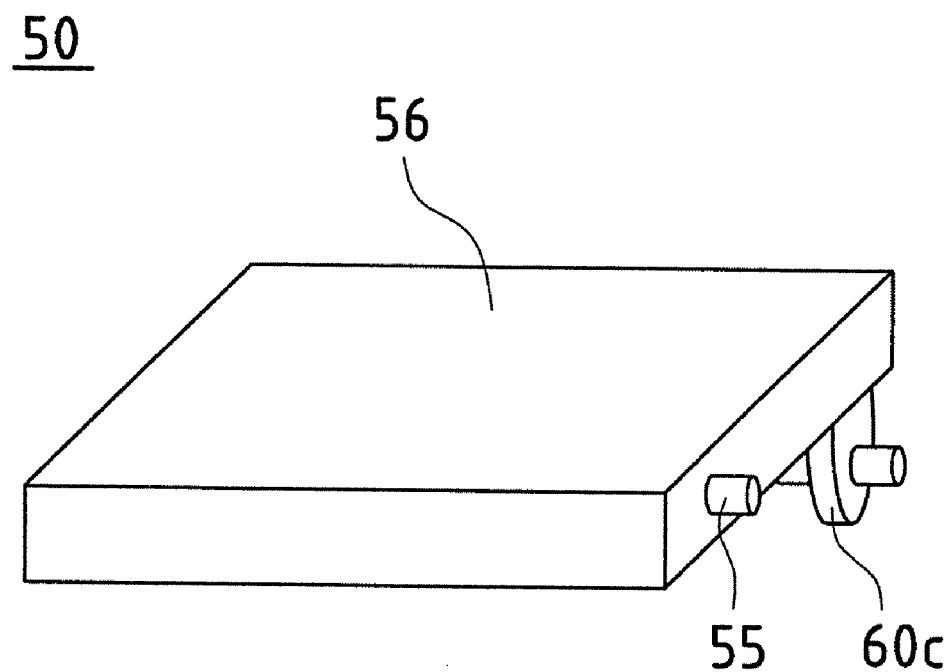
FIG. 6 is a perspective view showing an external appearance of a rotation mechanism of the second image reading unit shown in FIGS. 4 and 5.

The rotation support shaft 55 (rotational fulcrum Prs) extends outwardly from the unit casing 56 of the second image reading unit 50 and is supported appropriately by the frame structure 21 of the original transport apparatus 10 (see FIG. 2 and FIG. 6).

The rotation support shaft 55 performs support so as to allow rotation of the second image reading unit 50 centered on the rotational fulcrum Prs, which is arranged along the reading light path RL2 for reading an image at the second reading position RP2.

The rotational drive unit 60, which is arranged in contact with the unit casing 56 that accommodates the second image reading unit 50, drives the second image reading unit 50 such that it rotates centered on the rotational fulcrum Prs.

That is, the second image reading unit 50 is rotatable by way of the rotation support shaft 55, and is driven so as to rotate (revolve) in accordance with the rotational drive unit 60, which is arranged in contact with the unit casing 56 that accommodates the second image reading unit 50. It should be noted that the second image reading unit 50 shown in FIG. 4 is in a horizontal state as an initial state for example.

A translucent protective plate 66 is arranged between the second reading position RP2 corresponding to the transport path CR and the turning mirror 52 (unit casing 56). That is, the translucent protective plate 66 is formed by a glass plate for example, and is arranged along the reading light path RL2 so as to protect the second image reading unit 50 from foreign matter on the transport path CR. Furthermore, the reflected light from the original passes through the translucent protective plate 66 to be incident on the second image reading unit 50.

Accordingly, it is possible to enable the reflected light of the original from the second reading position RP2 to be guided to the turning mirror 52 and to prevent mechanical effects and ingression of dust from the transport path CR to the reading light path RL2 (inside the unit casing 56).

In a case where a request for double side reading from a user has been performed via the operation panel unit 106, first an image of the front side (first side) of the original is read at the home position of the first image reading unit 30 (the first reading position RP1).

After this, the original is further transported toward the discharge tray 19 along the transport path CR to be transported to the second reading position RP2, which is arranged along the light source 51 of the second image reading unit 50, then the second image reading unit 50 reads an image of the back side (second side) of the original that is transported in the transport path CR at the second reading position RP2.

In other words, it is possible to read images of both sides of the original easily and with high precision.

When the original is transported to the second reading position RP2, which is set corresponding to the guiding surface 62s of the curved original guide 62, the light that is irradiated to the back side of the original from the light source 51 of the second image reading unit 50 is reflected by the back side of the original to become reflected light. The reflected light from the second reading position RP2 is incident on the second image reading unit 50, and after its optical path is converted by the turning mirror 52, an image is formed on the image sensor 54 via the lens 53, which is then converted to electrical image data.

The rotational drive unit 60 is provided with an eccentric cam 60c, which is in contact with the unit casing 56 that accommodates and holds the second image reading unit 50, and an eccentric cam drive unit 60d that rotationally drives the eccentric cam 60c.

With this configuration, even when the eccentric cam 60c is revolved slightly, it is possible to cause large rotation of the second image reading unit 50 (the unit casing 56), such that the second reading position RP2 can be changed easily and with high precision.

FIG. 5 is an opened-up lateral view showing a state of second image reading unit shown in FIG. 4 when rotated and tilted.

By driving the eccentric cam drive motor 109a based on instructions from the driver 109, the eccentric cam drive unit 60d can rotationally drive the eccentric cam 60c. As described above, the eccentric cam 60c is configured to contact the surface of the unit casing 56 of the second image reading unit 50, and therefore along with rotation of the eccentric cam 60c, the second image reading unit 50 rotates so as to revolve to a state in which it is tilted from the horizontal direction.

Furthermore, the guiding surface 62s (transport path CR) of the curved original guide 62, which is arranged along the second reading position RP2 and guides the original, is shaped such an arc whose constant radius is a distance between the second reading position RP2 and the rotation support shaft 55 (rotational fulcrum Prs). That is, the guiding surface 62s is curved and set so as to form an arc surface shape centered on the rotation support shaft 55 (rotational fulcrum Prs).

When the eccentric cam 60c revolves to tilt the unit casing 56, a second reading position RP2b (RP2) moves with respect to the second reading position RP2a (RP2) of the initial state shown in FIG. 4. That is, the second reading position RP2 changes from the second reading position RP2a to the second reading position RP2b, thereby changing the arrangement of the reading light path RL2. Hereinafter, in cases where it is not necessary to distinguish between the second reading position RP2a and the second reading position RP2b, this is simply referred to as the second reading position RP2.

Although the arrangement (position) of the reading light path RL2 changes, the distance between the second reading position RP2 on the curved original guide 62 (guiding surface 62s) and the rotational fulcrum Prs is an arc of a constant radius, and therefore there is no change in the optical form (optical path length) of the reading light path RL2 (optical axis Lax2).

Accordingly, even though the position of the second reading position RP2 on the curved original guide 62 (guiding surface 62s) moves, it is possible to reliably detect the reflected light from the second reading position RP2 corresponding to the reading light path RL2 in a state in which the optical path length of the reading light path RL2 is fixed.

Furthermore, by revolving the rotational drive unit 60 (eccentric cam 60c) to alter the second reading position RP2 and change the arrangement (position) of the reading light path RL2, it is possible to avoid obstructions such as smearing or the like that is present midway on the reading light path RL2. That is, it becomes possible to carry out reading of an original in a state in which an obstruction that is present midway on the reading light path RL2 is avoided, and therefore an influence that an obstruction midway on the reading light path RL2 has on the image data of an original can be eliminated.

Accordingly, when forming an image based on image data that has been read, defects in the image data originating in an obstruction such as smearing that is present on the reading light path RL2 are suppressed and it becomes possible to prevent occurrences of flaws (white streaks, black streaks) in the formed image.

FIG. 6 is a perspective view showing an external appearance of a rotation mechanism of the second image reading unit shown in FIGS. 4 and 5.

The rotation support shaft 55, which is the rotational center of the unit casing 56, protrudes outwardly from the unit casing 56 and engages to the frame structure 21 of the original transport apparatus 10. Accordingly, the second image reading unit 50 can be stably rotated.

Furthermore, a rotational shaft (gear wheel) of the eccentric cam 60c meshes with the eccentric cam drive unit 60d (gear wheel) and due to an effect of the eccentric cam 60c being revolved on the rotational shaft by the eccentric cam drive unit 60d, the unit casing 56 becomes tilted (see FIGS. 4 and 5).

Figure 7:
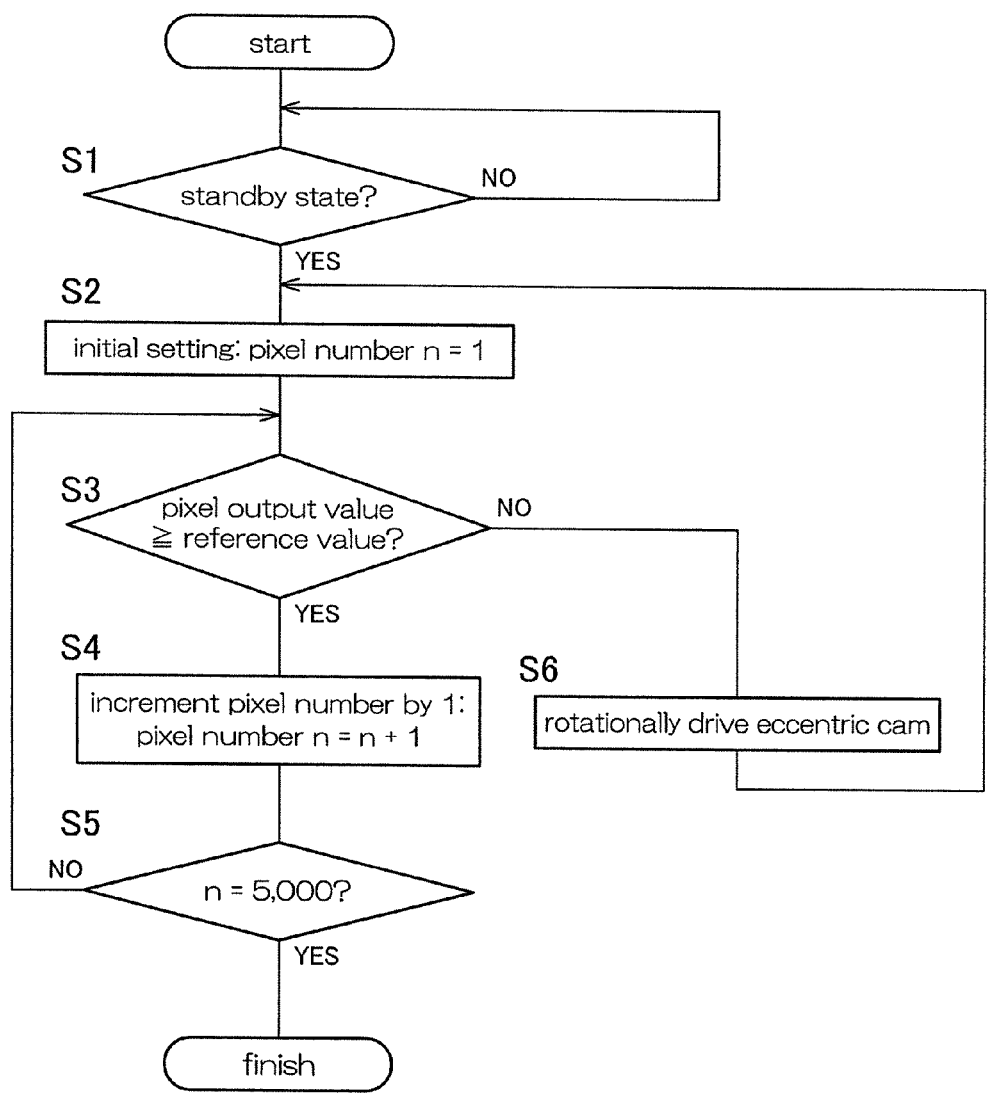
FIG. 7 is a flowchart showing an example flow of control relating to a reading position adjustment method of the original transport and reading apparatus according to Embodiment 1 of the present invention.

FIG. 7 is a flowchart showing an example flow of control relating to a reading position adjustment method of the original transport and reading apparatus according to Embodiment 1 of the present invention.

Description is given of an example flow of control as a reading position adjustment method of the original transport and reading apparatus 1, in which the reading position RP2 of the second image reading unit 50 is adjusted. It should be noted that the flow of control in step S1 through step S6 is executed by the control unit 101 of the original transport and reading apparatus 1. That is, the control unit 101 is configured so as to execute the flow of control of step S1 through step S6 based on a program that is incorporated in advance.

Step S1:

A determination is performed as to whether or not the original transport and reading apparatus 1 is in a standby state (standby state detection step). When it is in a standby state (step S1: yes), the procedure transitions to step S2. When it is not in a standby state (step S1: no), the procedure returns to step S1.

It should be noted that this step can be implemented in a manner in which it is executed at appropriate intervals. For example, it can be implemented in a manner in which it is executed at appropriate times such as at a time of morning startup, a time of afternoon startup, or in a case where a flaw (white streak, black streak) has occurred in a formed image when the image was formed based on an image that has been read.

Step S2:

Based on a pixel number n as a variable, a pixel number n=1 is set as an initial setting. For example, the pixel number n=1 can be applied to a first pixel in a pixel row of the image sensor (image sensor 54). Or it is also possible to commence from an arbitrary position in a pixel row.

Step S3:

The second image reading unit 50 is put into an operational state and light is irradiated from the light source 51 to the second reading position RP2. The reflected light from the second reading position RP2 is detected by the image sensor 54 as electrical signals.

That is, the second image reading unit 50 is started up when a standby state has been detected, and reflected light from the second reading position RP2 is obtained by the image sensor 54 of the second image reading unit 50 (second reading position reflected light obtaining step).

Further still, a determination is performed as to whether or not a pixel output value is larger than a reference value.

That is, a presence/absence of an abnormal state is detected by comparing the pixel output value of reflected light obtained by each pixel (pixel number n) against a preset reference value for each pixel (pixel number n) of the image sensor 54 (abnormal state detection step).

When the pixel output value is the reference value or higher (step S3: yes), the procedure transitions to step S4. When the pixel output value is less than the reference value (step S3: no), the procedure transitions to step S6.

For example, a value of 50% of a maximum value, which has been set as a detection range of pixel output values, is set as the reference value.

In a case where the pixel output value is smaller than the reference value, there is a state in which the reflected light obtained from the second reading position RP2 via the reading light path RL2 does not satisfy the reference, and therefore it is evident that there is an abnormality in the reading light path RL2.

Examples of an abnormal state include a case where smearing has adhered to the translucent protective plate 66 that is arranged on the reading light path RL2. It should be noted that the translucent protective plate 66 is arranged inside the original transport apparatus 10 and therefore is extremely difficult to clean other than during maintenance. That is, unlike when smearing has adhered to the platen 38, it is extremely difficult to remove smearing that has adhered to the translucent protective plate 66.

Furthermore, since reflected light from the second reading position RP2 is detected while no original is present, it is preferable that the curved original guide 62 is a white color for example.

Step S4:

Since the pixel output value exceeds the reference value, the pixel number is set to n=n+1, thereby incrementing the pixel number n by 1. After the pixel number n is incremented, the procedure transitions to step S5.

Step S5:

A determination is performed as to whether or not the pixel number n is equivalent to a number of pixels (for example, a number of pixels of 5,000) that constitute the image sensor 54 for example. When this is equivalent to a number of pixels of 5,000 (step S5: yes), this means it is confirmed with respect to all the pixels that there is no abnormality and therefore the procedural flow finishes. Furthermore, when this is different from a number of pixels of 5,000 (step S5: no), the procedure returns to step S3 and determination continues for the pixel output value of the next pixel.

Step S6:

Since an abnormal state has been determined at step S3, it is determined that there is a condition in which smearing is adhering to the translucent protective plate 66 and a black streak (or a white streak) will occur, and the eccentric cam 60c is rotationally driven by the eccentric cam drive unit 60d.

That is, by rotationally driving the eccentric cam 60c, the second image reading unit 50 is rotated to change the second reading position RP2 (second reading position changing step).

After the second reading position RP2 has been changed, the procedure returns to step S2, and an initial setting is again performed as "pixel number n=1" to execute a flow of determining the pixel output values. That is, the abnormal state detection step and the second reading position changing step are repeated until it is determined that there is no abnormal state in any of the pixels of the image sensor 54.

With the flow of control of the above-described step S1 through step S6, obstructions in the reading light path RL2 are detected in advance and it becomes possible to obtain image data with high precision and to prevent in advance occurrences of problems (flaws such as white streaks or black streaks) in the image to be formed.

As described above, the original transport and reading apparatus 1 according to the present embodiment is provided with a control unit 101 that controls the rotational drive unit 60, and the control unit 101 is configured so that, when the pixel output value of each pixel of the image sensor 54 of the second image reading unit 50 has been compared against a reference value and an abnormal state has been detected, it controls the rotational drive unit 60 to rotate the second image reading unit 50.

Accordingly, it becomes possible to change the reading light path RL2 (second reading position RP2) in response to a state of obstruction in a region of the reading light path RL2, and correct image data can be obtained by preventing the image data from being influenced by an obstruction (smearing or the like that affects image forming) present on the reading light path RL2.

Embodiment 2

Figure 8:
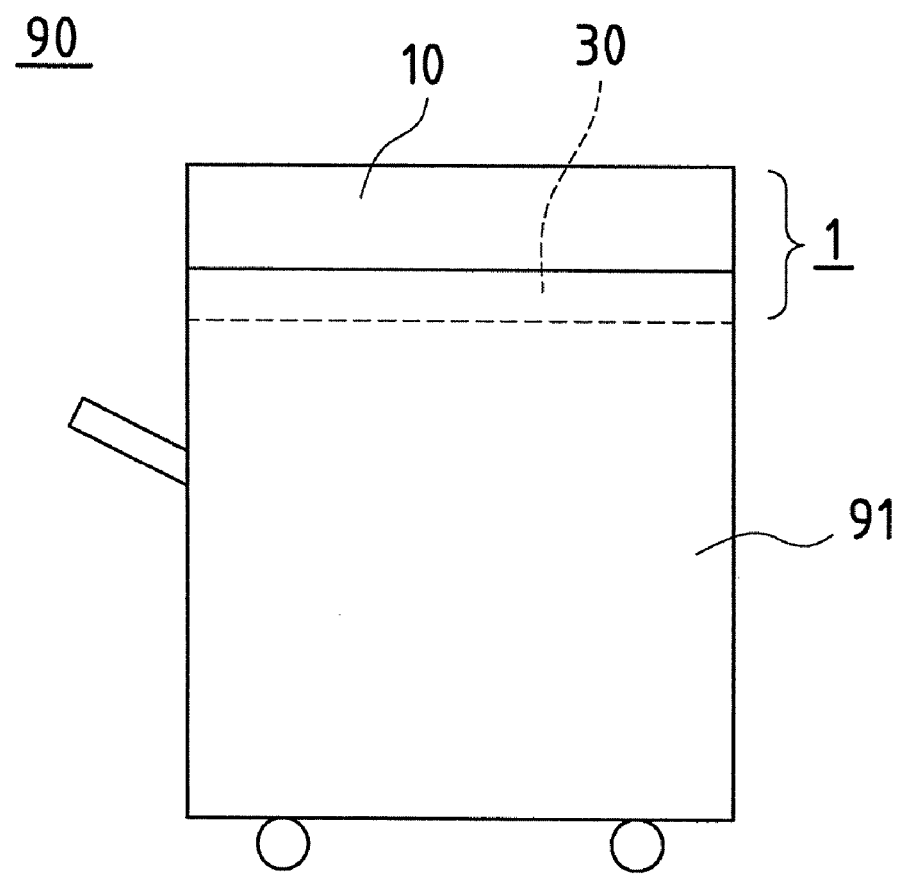
FIG. 8 is a lateral view showing an outline configuration of an image forming apparatus according to Embodiment 2 of the present invention.

Description is given regarding an image forming apparatus (for example, a copier) according to Embodiment 2 of the present invention with reference to FIG. 8.

FIG. 8 is a lateral view showing an outline configuration of an image forming apparatus according to Embodiment 2 of the present invention.

An image forming apparatus 90 that forms an image is provided with an original transport and reading apparatus 1, which transports an original and reads an image of the original, and an image forming unit 91 that forms an image based on image data read by the original transport and reading apparatus 1.

In consideration of such factors as ease of loading and transporting originals and moreover the operability of the image forming apparatus 90, the original transport apparatus 10 is arranged at an upper area of the image forming apparatus 90. Furthermore, the first image reading unit 30, which is provided with the original transport apparatus 10, is incorporated with the image forming unit 91 to simplify the structure.

Since the original transport apparatus 10 described in Embodiment 1 is applied for the original transport apparatus 10 according to the present embodiment, an image forming apparatus 90 can be achieved in which flaws (white streaks, black streaks, or the like) are not produced in the image to be formed.

The present invention can be embodied and practiced in other different forms without departing from the spirit, purport or essential characteristics thereof. Therefore, the above-described embodiments are considered in all respects as illustrative and not restrictive. The scope of the invention is indicated by the appended claims rather than by the foregoing description. All variations and modifications falling within the equivalency range of the appended claims are intended to be embraced therein.

What is claimed is:

1. An original transport and reading apparatus, comprising:
   an original transport apparatus having a transport path on which an original is transported, a first image reading unit that is arranged in opposition to the original transport apparatus and reads an image of a transported original at a first reading position that is demarcated along the transport path, a second image reading unit that is arranged on an inner side of a casing of the original transport apparatus and reads an image of a transported original at a second reading position that is demarcated along the transport path, a rotation support shaft that performs support so as to allow rotation of the second image reading unit centered on a rotational fulcrum that is arranged along a reading light path for reading an image at the second reading position, a rotational drive unit that drives so as to rotate the second image reading unit centered on the rotational fulcrum, and a curved original guide having a guiding surface that is curved in which the second reading position is set and that guides the original, wherein the guiding surface of the curved original guide is an arc whose constant radius is a distance between the second reading position and the rotational fulcrum.

2. The original transport and reading apparatus according to claim 1, wherein the second image reading unit comprises a turning mirror on the reading light path that turns and reflects reflected light from the second reading position, and the rotational fulcrum is caused to match a turning point of an optical axis of the reading light path.

3. The original transport and reading apparatus according to claim 1, comprising a deflecting original guide that deflects an original so that the original contacts the guiding surface of the curved original guide.

4. The original transport and reading apparatus according to claim 1, wherein the rotational drive unit is provided with an eccentric cam that is in contact with a unit casing that accommodates and holds the second image reading unit, and an eccentric cam drive unit that rotationally drives the eccentric cam.

5. The original transport and reading apparatus according to claim 1, wherein a translucent protective plate is arranged between the second reading position and the turning mirror.

6. The original transport and reading apparatus according to claim 4, wherein the rotation support shaft protrudes from the unit casing and engages to a frame structure of the original transport apparatus.

7. The original transport and reading apparatus according to claim 5, wherein the rotation support shaft protrudes from the unit casing and engages to a frame structure of the original transport apparatus.

8. The original transport and reading apparatus according to claim 1, wherein an image of a first side of an original is read at the first reading position and an image of a second side of the original on an opposite side from the first side is read at the second reading position.

9. The original transport and reading apparatus according to claim 1, comprising a control unit that controls the rotational drive unit, wherein when a pixel output value of each pixel of an image sensor of the second image reading unit is compared against a reference value and an abnormal state has been detected, the control unit controls the rotational drive unit to rotate the second image reading unit.

10. An image forming apparatus, comprising:

an original transport and reading apparatus that transports an original and reads an image of the original, and an image forming unit that forms an image based on image data read by the original transport and reading apparatus, wherein the original transport and reading apparatus is the original transport and reading apparatus according to claim 1.

11. A reading position adjustment method of an original transport and reading apparatus, the original transport and reading apparatus comprising an original transport apparatus having a transport path on which an original is transported, a first image reading unit that is arranged in opposition to the original transport apparatus and reads an image of a transported original at a first reading position that is arranged along the transport path, and a second image reading unit that is arranged on an inner side of a casing of the original transport apparatus and reads an image of a transported original at a second reading position that is arranged along the transport path, the method being for adjusting a position of the second reading position and comprising:

a standby state detection step of detecting a standby state, a second reading position reflected light obtaining step of starting up the second image reading unit when a standby state has been detected, and obtaining reflected light from the second reading position by an image sensor of the second image reading unit, an abnormal state detection step of detecting a presence/absence of an abnormal state by comparing a pixel output value of reflected light obtained by each pixel against a reference value for each pixel of the image sensor, and a second reading position changing step of changing the second reading position by rotating the second image reading unit when an abnormal state has been detected in the abnormal state detection step, wherein the abnormal state detection step and the second reading position changing step are repeated until a determination is made that there is no abnormal state in any of the pixels of the image sensor.

* * * * *